US 9,122,369 B2

(12) United States Patent
Hwang (10) Patent No.: US 9,122,369 B2
(45) Date of Patent: Sep. 1, 2015

(54) MOBILE DEVICE AND METHOD FOR UPDATING DISPLAY SCREEN WITH ONLINE WIDGET

(75) Inventor: Seong Hee Hwang, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 624 days.

(21) Appl. No.: 12/927,582

(22) Filed: Nov. 18, 2010

(65) Prior Publication Data

US 2011/0119355 A1     May 19, 2011

(30) Foreign Application Priority Data

Nov. 18, 2009   (KR) .................. 10-2009-0111567

(51) Int. Cl.
*G06F 15/167*     (2006.01)
*G06F 3/0481*     (2013.01)
*G06F 9/44*       (2006.01)

(52) U.S. Cl.
CPC .......... *G06F 3/04817* (2013.01); *G06F 9/4443* (2013.01)

(58) Field of Classification Search
CPC ........................ G06G 3/04817; G06F 9/4443
See application file for complete search history.

(56) References Cited

U.S. PATENT DOCUMENTS

| | | | | |
|---|---|---|---|---|
| 5,230,072 A * | 7/1993 | Smith et al. | ........................... | 1/1 |
| 6,266,056 B1 * | 7/2001 | Kanungo | ...................... | 715/744 |
| 8,261,256 B1 * | 9/2012 | Adler et al. | ................... | 717/173 |
| 8,595,186 B1 * | 11/2013 | Mandyam et al. | ............ | 707/632 |
| 2008/0215998 A1 * | 9/2008 | Moore et al. | ................... | 715/762 |
| 2009/0247134 A1 * | 10/2009 | Jeide et al. | ................ | 455/414.2 |
| 2009/0265422 A1 * | 10/2009 | Park et al. | ..................... | 709/203 |
| 2010/0145602 A1 * | 6/2010 | Morris | ......................... | 701/200 |

* cited by examiner

*Primary Examiner* — Jude Jean Gilles
*Assistant Examiner* — Jaren M Means (57) ABSTRACT

A mobile device has embedded online widgets and executes a method for updating a display screen with the widgets. In the method, the mobile device receives widget update data from widget servers and then enables a flag bit of a specific one of divided regions in a widget integrated buffer. Each divided region is allocated for each widget server, and the specific divided region corresponds to the widget server that transmits the widget update data. The mobile device stores the received widget update data in the specific divided region and then determines whether a predefined display update interval arrives. If the display update interval arrives, the mobile device outputs the display screen to which the widget update data stored in the specific divided region is applied.

20 Claims, 4 Drawing Sheets

MOBILE DEVICE AND METHOD FOR UPDATING DISPLAY SCREEN WITH ONLINE WIDGET

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 18, 2009 and assigned Serial No. 10-2009-0111567, the entire disclosure of which is hereby incorporated by reference.

TECHNICAL FIELD OF THE INVENTION

The present invention relates generally to a technique to update a display screen of a mobile device and, more particularly, to a mobile device and method for updating a display screen containing online widgets by effectively applying real-time received widget update data to the widgets.

BACKGROUND OF THE INVENTION

A widget refers to a stand-alone program with a small data size and is normally offered in the form of an icon on a display screen of a mobile device. Through such widgets, a user can easily obtain desired information even without using a web browser. The widgets used for the mobile device may be classified as offline widgets and online widgets. While the offline widget provides simple decorative effects such as a clock or a picture frame, the online widget informs the arrival of an incoming e-mail or offers real-time information such as news, weather, traffic, stock, and such. In particular, the online widget receives real-time widget update data from a widget server and displays it on the display screen of the mobile device, thus allowing a user to quickly obtain current information.

Figure 1:
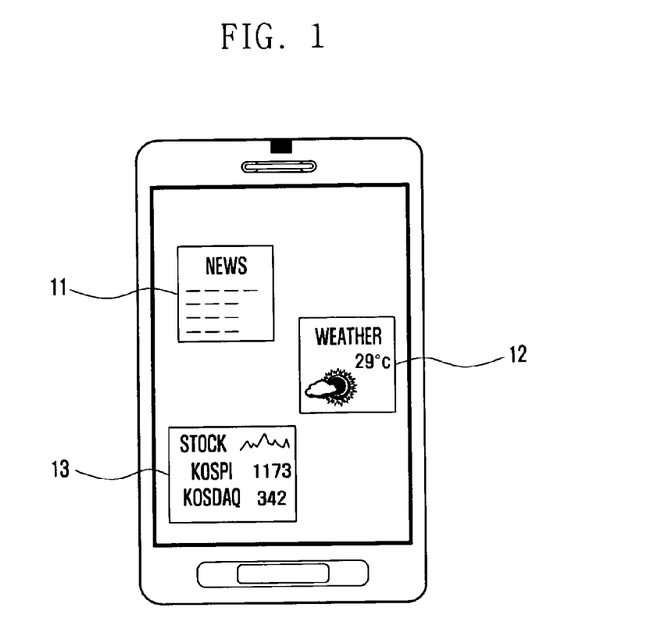
FIG. 1 illustrates a mobile device displaying online widgets.

FIG. 1 illustrates a mobile device displaying online widgets.

Referring to FIG. 1, the mobile device displays, for example, a news widget 11, a weather widget 12, and a stock widget 13 on a screen. The mobile device receives widget update data from each widget server, namely a news widget server providing the news widget 11, a weather widget server providing the weather widget 12, and a stock widget server providing the stock widget 13. Then the mobile device outputs a display screen to which received widget update data is applied.

A mobile device may also have different widget buffers. When receiving widget update data from the respective widget servers, the mobile device temporarily stores received widget update data in corresponding widget buffers and displays it on the display screen. Recently most end-users may often use many online widgets in the mobile device. As the number of online widgets installed in the mobile device increases, the mobile device receives a large amount of widget update data in a short time. Whenever receiving widget update data, the mobile device considers it as an individual event and then processes such events one by one. Unfortunately, this may not only cause reduction in a processing speed when the mobile device applies widget update data to the display screen, but also lowers the performance of the mobile device.

SUMMARY OF THE INVENTION

To address the above-discussed deficiencies of the prior art, it is a primary object to provide a method for updating a display screen without affecting the performance of a mobile device when the mobile device that includes embedded online widgets receives widget update data.

Another aspect of the present invention is to provide a mobile device capable of executing the above-mentioned method.

According to an aspect of the present invention, provided is a method for updating a display screen of a mobile device. The method includes receiving at least one piece of widget update data from at least one widget server, each piece of widget update data associated with a widget on the mobile device. The received widget update data is stored in a corresponding divided region of a widget integrated buffer, each divided region allocated for a widget on the mobile device. Whether a predefined display update interval arrives is determined. And if the display update interval arrives, the widget update data for each divided region that is indicated for display is displayed.

According to another aspect of the present invention, provided is a mobile device including a radio frequency unit configured to receive at least one piece of widget update data from at least one widget server, each piece of widget update data associated with a widget on the mobile device. A widget integrated buffer contains at least one divided region, each divided region allocated for a widget on the mobile device and has a flag bit to indicate when to display widget update data stored in the divided region. A display unit outputs a display screen. And a control unit displays the widget update data for each divided region that is indicated for display when a display update interval arrives.

According to yet another aspect of the present invention, a computer program product for updating a display screen of a mobile device is provided. The computer program product includes a computer-readable storage medium computer usable program code tangibly embodied thereon. The computer usable program code includes instructions for 1) receiving at least one piece of widget update data from at least one widget server, each piece of widget update data associated with a widget on the mobile device, 2) storing the received widget update data in a corresponding divided region of a widget integrated buffer, each divided region allocated for a widget on the mobile device, 3) determining whether a predefined display update interval arrives, and 4) if the display update interval arrives, displaying the widget update data for each divided region that is indicated for display.

According to some aspects of this invention, the mobile device that includes online widgets can update the display screen without affecting its performance when receiving widget update data. Therefore, not only the display speed of the mobile device but also the operating speeds of other functions may all be improved. In addition, the burden on the mobile device is relieved and hence a battery life is increased. Accordingly, a user can use a greater variety of online widget services through the mobile device.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication device. This invention may, however, be embodied in many different forms and should not be construed as limited to the embodiments set forth herein. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

Although the following embodiment adopts a mobile device, also referred as a portable or handheld device, this is for illustrative purposes only and not to be considered as a limitation of the present invention. Alternatively, this invention may also be applied to any other non-portable devices such as a desktop personal computer. A mobile device according to this invention may include a mobile communication terminal, a digital broadcasting receiver, a personal digital assistant (PDA), a smart phone, and such. Such a mobile device should have a communication module that can receive data from a widget server. Among the above examples, a mobile communication terminal may include IMT-2000 (international mobile telecommunication 2000) terminals, WCDMA (wideband code division multiple access) terminals, GSM/GPRS (global system for mobile communication/general packet radio service) terminals, and UMTS (universal mobile telecommunication service) terminals.

Among terms set forth herein, a widget server, as one of the elements of a widget service system, refers to a specific server that creates widget-related data and offers it to a mobile device. The widget server transmits widget-related data such as a widget installation program and widget update data to the mobile device through a wired or wireless network. The widget servers may be classified according to their widget services or service providers. It is desirable that the widget service system for this invention involves a plurality of widget servers.

Additionally, widget update data refers to real-time update data received from the widget servers after the mobile device executes online widgets embedded therein. For instance, there are real-time new data for a new widget, real-time weather data for a weather widget, real-time stock data for a stock widget, and such. The mobile device in this invention receives widget update data from the widget servers and then applies it to a display screen.

Furthermore, a widget integrated buffer is one of the elements of the mobile device and refers to a specific storage for temporarily storing widget update data received from the widget servers. Preferably, the widget integrated buffer is formed of a single buffer and has a plurality of divided regions, each of which is allocated for each widget server. The widget integrated buffer has a predefined storage capacity and may flexibly produce or remove such divided regions. When a certain widget is newly installed in the mobile device through a widget installation program, the widget integrated buffer produces a new divided region corresponding to the installed widget. Each divided region is composed of a flag bit for recording information about whether to store widget update data, and a data bit for storing substantial data.

Moreover, a display update interval refers to a particular period of time to output a modified display screen in the mobile device. Namely, the mobile device performs an update of the display screen according to a predefined display update interval which may be fixed by default or set by a user. If a user is allowed to set the display update interval, the mobile device has a menu for setting the display update interval.

Figure 2:
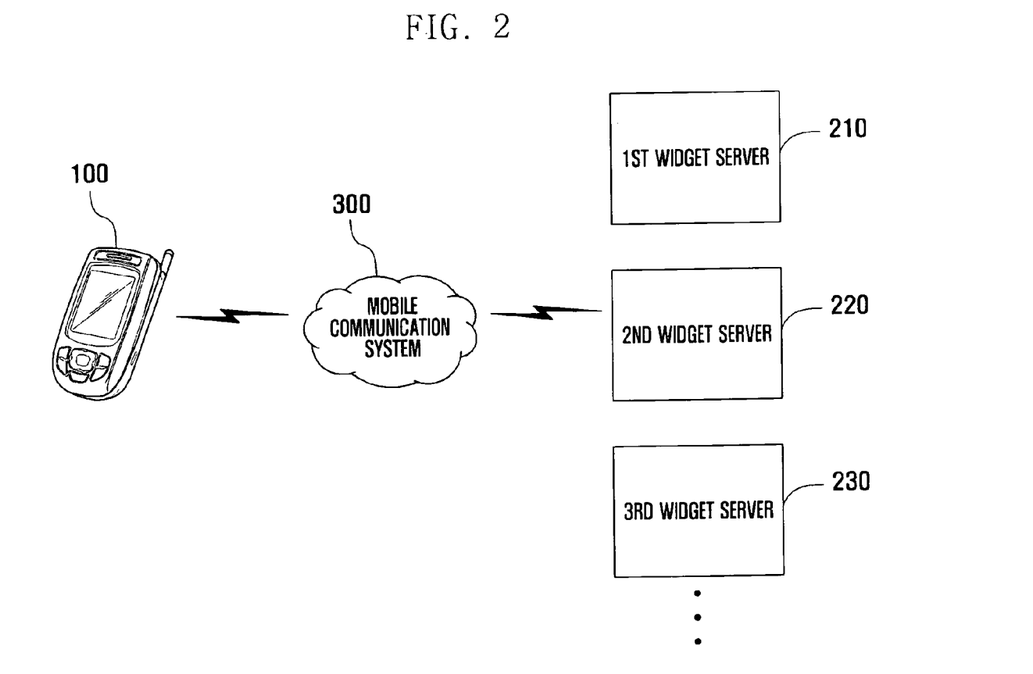
FIG. 2 illustrates a widget service system including a mobile device in accordance with an embodiment of the present invention.

FIG. 2 illustrates a widget service system including a mobile device in accordance with an embodiment of the present invention.

Referring to FIG. 2, the widget service system includes the mobile device 100, a plurality of widget servers 210, 220 and 230, and a mobile communication system 300. Although FIG. 2 shows three widget servers 210, 220 and 230, this is for illustrative purposes only and not to be considered as a limitation of the present invention. The widget service system may further have any other widget servers, if necessary.

The mobile device 100 receives widget-related data from the respective widget servers 210, 220, and 230 through the mobile communication system 300. Specifically, the mobile device 100 receives widget installation programs from the respective widget servers 210, 220, and 230, and then installs widgets therein by executing received installation programs. Also, when installing widgets, the mobile device 100 produces new divided regions corresponding to such widgets in the widget integrated buffer. Then the mobile device 100 receives real-time widget update data from the respective widget servers 210, 220, and 230.

The widget servers 210, 220, and 230 are specific servers that transmit widget update data to the mobile device through the mobile communication system 300. Particularly, these widget servers 210, 220, and 230 may use a data push model when transmitting widget update data to the mobile device 100. For example, in FIG. 2, the first widget server 210 sends a first kind of widget update data to the mobile device 100. Similarly, the second widget server 220 sends a second kind of widget update data to the mobile device 100, and the third widget server 230 sends a third kind of widget update data to the mobile device 100. For instance, if the first widget server 210 is a weather widget server, the first widget server 210 sends real-time weather update data to the mobile device 100.

In this embodiment, each widget installed in the mobile device 100 corresponds to each of the widget servers 210, 220, and 230. Namely, different widgets embedded in the mobile device 100 are updated by different widget servers. The present invention is, however, not limited to this one-to-one correspondence. In other embodiments, a certain single widget server may provide widget update data of two or more widgets, and also two or more widget servers may provide widget update data of the same widget.

Additionally, in this embodiment, the mobile device 100 performs a direct data communication with the respective widget servers 210, 220, and 230 through the mobile communication system 300. The present invention is, however, not limited to such a direct data communication. Alternatively, the widget service system may further include a certain intermediate widget server (not shown) that mediates a communication between the mobile device 100 and the respective widget servers 210, 220, and 230. The intermediate widget server may send and receive data to and from each of the widget servers 210, 220, and 230 via a suitable communication network such as Internet, LAN (local area network), and such, and also may send and receive data to and from the mobile device 100 via the mobile communication system 300. The intermediate widget server is not separated necessarily from the respective widget servers 210, 220, and 230 and in some embodiments may be realized in the form of being united with one widget server.

The mobile communication system 300 provides a network that allows the mobile device 100 to access the respective widget servers 210, 220, and 230. The mobile communication system 300 may include a base station for establishing a wireless communication channel with the mobile device 100, a base station controller for controlling the base station, a mobile switching center, a WAP gateway for making an access to the widget servers 210, 220, and 230, and such.

Heretofore, the widget service system including the mobile device 100 has been described in detail. Now, the mobile device 100 that receives data from the widget server 210, 220, and 230 through the mobile communication system 300 will be described in detail.

Figure 3:
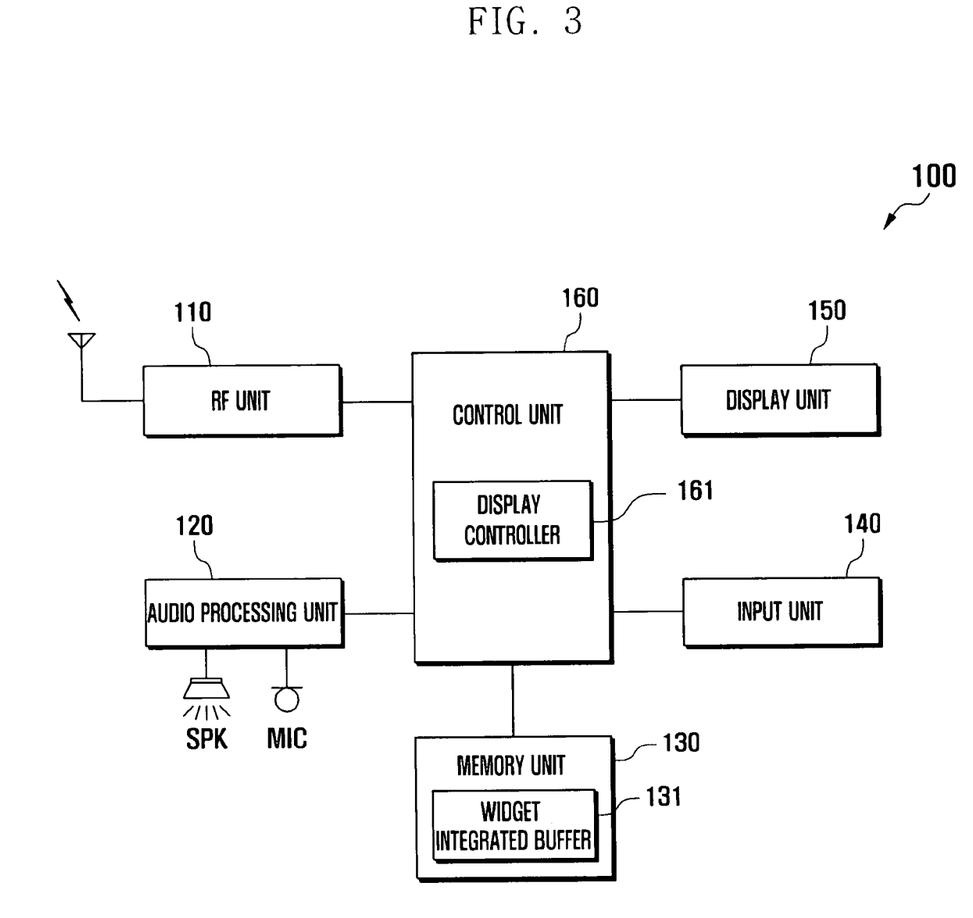
FIG. 3 illustrates a mobile device in accordance with an embodiment of the present invention.

FIG. 3 illustrates a mobile device in accordance with an embodiment of the present invention.

Referring to FIG. 3, the mobile device 100 includes a radio frequency (RF) unit 110, an audio processing unit 120, a memory unit 130, an input unit 140, a display unit 150, and a control unit 160.

The RF unit 110 performs a function to transmit and receive data for a wireless communication of the mobile device 100. The RF unit 110 may include an RF transmitter that upwardly converts the frequency of transmitted signals and amplifies the transmitted signals, and an RF receiver that amplifies received signals with low-noise and downwardly converts the frequency of the received signals. Additionally, the RF unit 110 may receive data through a wireless channel and then output it to the control unit 160, and also may receive data from the control unit 160 and then transmit it through a wireless channel. The RF unit 110 in embodiments of this invention receives widget update data from the respective widget servers 210, 220, and 230 through the mobile communication system 300.

The audio processing unit 120 may be formed of codec, which has a data codec for processing packet data and an audio codec for processing audio signals. The audio processing unit 120 converts digital audio signals into analog audio signals through the audio codec and then outputs them through the speaker (SPK). Additionally, the audio processing unit 120 converts analog audio signals from the microphone (MIC), into digital audio signals through the audio codec.

The memory unit 130 performs a function to store various programs and data required for operations of the mobile device 100 and, thus, includes a program region and a data region. The memory unit 130 may be formed of a volatile or nonvolatile memory device or a combination thereof. For instance, a volatile memory device may use semiconductor memory devices such as RAM, DRAM or SRAM, and a nonvolatile memory device may use ROM, flash memory, or a hard disk. Particularly, the program region of the memory unit 130 in embodiments of this invention stores at least one widget program. Additionally, the memory unit 130 in embodiments of this invention includes a widget integrated buffer 131 that temporarily stores widget update data received from the respective widget servers 210, 220, and 230.

Preferably, the widget integrated buffer 131, according to an embodiment of this invention, is designed in the form of a single buffer. However, this invention is not limited to this form, and if necessary, the widget integrated buffer 131 may be designed in the form of combined buffers. In particular, the widget integrated buffer 131 is designed in the form of storage that includes predefined storage capacity and has several divided regions each of which is allocated for each of the widget servers 210, 220, and 230. For instance, the widget integrated buffer 131 is configured to have three divided regions respectively allocated for the first, second, and third widget servers 210, 220, and 230 shown in FIG. 2. Such divided regions are produced in the widget integrated buffer 131 when widgets are installed in the mobile device 100. Namely, the mobile device 100 installs a certain widget by using a widget installation program and then produces a divided region for storing widget update data related to the installed widget in the widget integrated buffer 131. The configuration of the widget integrated buffer 131 is exemplarily shown in FIG. 4.

Figure 4:
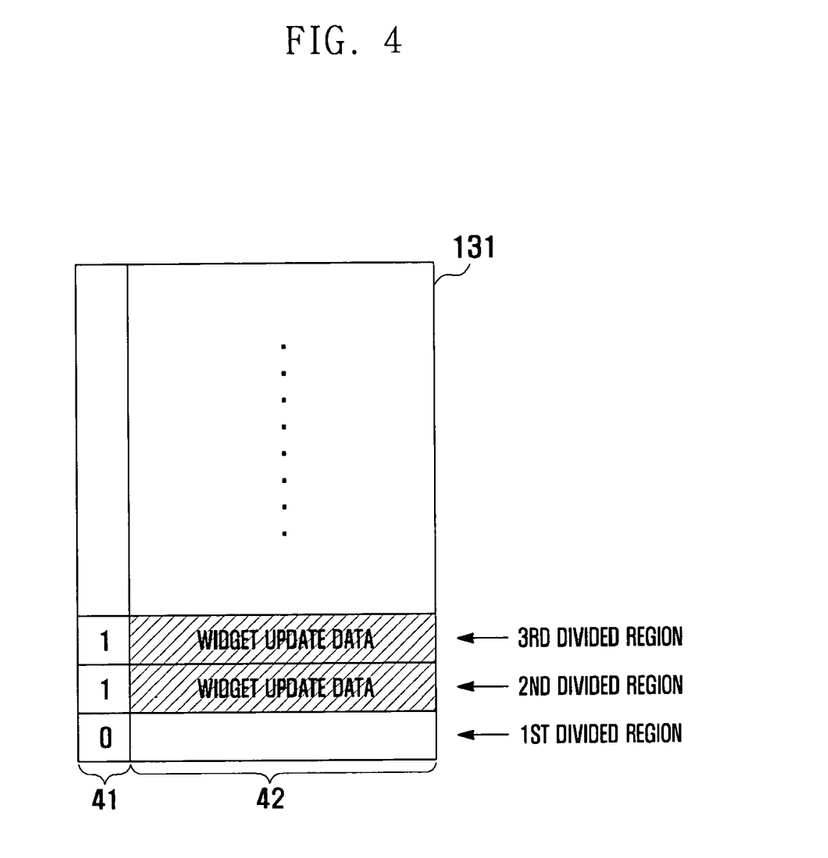
FIG. 4 illustrates a widget integrated buffer in accordance with an embodiment of the present invention.

FIG. 4 illustrates a widget integrated buffer in accordance with an embodiment of the present invention.

As shown in FIG. 4, the widget integrated buffer 131 has a single physical buffer that contains a plurality of divided regions. Each divided region is matched to each widget installed in the mobile device 100. Although in this disclosure the widget integrated buffer 131 has three divided regions corresponding to the first, second, and third widgets, this is for illustrative purposes only and not to be considered as a limitation of the present invention. Depending on the capacity of the widget integrated buffer 131 and on the number of widgets installed in the mobile device 100, the widget integrated buffer 131 may further have any other divided regions. Namely, if fourth and fifth widgets are installed in the mobile device 100, the widget integrated buffer 131 can further contain two additional divided regions.

Each divided region according to an embodiment of this invention may be composed of a flag bit 41 and a data bit 42. The flag bit 41 refers to a location for recording information that indicates whether widget update data is stored in the divided region. When widget update data is stored in the divided region, the flag bit 41 records numeric '1'. However, after widget update data stored in the divided region is applied to a display screen, the flag bit 41 records numeric '0'. In an example shown in FIG. 4, the first divided region contains no widget update data (so, the flag bit 41 records '0'), whereas the second and third divided regions contain widget update data (so, the flag bit 41 records '1'). Meanwhile, the data bit 42 is a location for storing substantial data of widget update data.

The input unit 140 creates a key input signal for controlling the mobile device 100 in response to a user's manipulation, and then sends it to the control unit 160. The input unit 140 may be formed of a keypad that adopts a 3*4 or QWERTY key arrangement and has a plurality of alphanumeric keys, navigation keys and function keys: Alternatively or additionally, the input unit 140 may be formed of a touch-sensitive surface such as a touch pad or a touch screen. Furthermore, various sensors such as an image sensor and an acceleration sensor may be used for the input unit 140.

The display unit 150 may be formed of LCD (liquid crystal display), OLED (organic light emitting diodes), AMOLED (active matrix OLED), or any other equivalent. The display unit 150 visually offers various menus, input data, function setting information, and any other information. For instance, the display unit 150 performs a function to output a booting screen, an idle screen, a call screen, and any other application execution screens. Particularly, the display unit 150 in embodiments of this invention displays given widget images thereon and also outputs a display screen to which widget update data is applied after received from the respective widget servers 210, 220, and 230.

The control unit 160 performs an overall control function related to the mobile device 100. The control unit 160, in embodiments of this invention, may have a display controller 161 that controls the display unit 150. The display controller 161 creates an image according to a display update interval and then controls the display unit 150 to output the created image. Although in this embodiment shown in FIG. 3, the display controller 161 is contained in the control unit 160, this is for illustrative purposes only. Alternatively, the display controller 161 may be formed as an independent module which is separated from the control unit 160. A function to create an image to be outputted on the display unit 150 may be performed by the display controller 161 instead of the control unit 160. Additionally, the display controller 161 in this embodiment may have a flash engine (not shown) that creates a dynamic image to be outputted on the display unit 150 and also creates a widget image modified in real time.

The control unit 160 receives widget update data from the respective widget servers 210, 220, and 230 by controlling the RF unit 110. When the widget servers 210, 220, and 230 send a notification about the generation of a widget update event to the mobile device 100, together with widget update data, the control unit 160 receives the notification and the widget update data from the widget servers 210, 220, and 230 by controlling the RF unit 110. Here, depending on the generation time of a widget update event, the control unit 160 may receive the widget update data simultaneously or sequentially. Then the control unit 160 temporarily stores the received widget update data in the widget integrated buffer 131 of the memory unit 130. The control unit 160 ascertains which of widgets installed in the mobile device 100 is related to the received widget update data. Here, the widget update data contains an identifier (e.g., widget ID) used to identify a specific widget. Through the identifier, the control unit 160 can ascertain which widget is related to the received widget update data and also can determine which widget server has transmitted the widget update data.

After checking the identifier in the widget update data, the control unit 160 selects a specific divided region corresponding to the widget server transmitting the widget update data and then enables the flag bit 41 of the selected divided region in the widget integrated buffer 131. A process of enabling the flag bit 41 may be understood as a process of reserving the widget update data to be applied to the display screen. When enabling the flag bit 41, the control unit 160 inputs numeral '1' into the flag bit 41. Then the control unit 160 stores the received widget update data in the data bit 42 of the specific divided region that includes the enabled flag bit 41. Additionally, the control unit 160 determines whether the elapsed time reaches a predefined display update interval, and stores the received widget update data in the widget integrated buffer 131 until the elapsed time reaches the display update interval. If the elapsed time reaches the display update interval, the control unit 160 sends a display update command to the display controller 161. Then the display controller 161 checks the enabled flag bit 41, namely the flag bit 41 with numeral '1', in the divided regions of the widget integrated buffer 131. The display controller 161 retrieves the stored widget update data from the divided region with the enabled flag bit 41 in the widget integrated buffer 131, and then controls the display unit 150 to output the display screen to which the retrieved widget update data is applied.

The widget update data that the control unit 160 receives through the RF unit 110 may either be raw data or data encoded by the respective widget servers 210, 220, and 230. Namely, the control unit 160 may store the received widget update data in the form of raw data or encoded data in the widget integrated buffer 131. If the control unit 160 sends a display update command to the display controller 161 at specific time according to the display update interval, the display controller 161 decodes the encoded data and then controls the display unit 150 to output the display screen to which the decoded widget update data is applied. Here, the display controller 161 should have a particular algorithm for decoding the encoded data. Preferably, this algorithm is the same as the algorithm used to encode raw data by the respective widget servers 210, 220, and 230.

After the widget update data stored in a specific divided region with the enabled flag bit 41 is displayed on the display unit 150 under the control of the display controller 161, the control unit 160 removes the widget update data from the divided region. In addition, the control unit 160 disables the flag bit 41 of the divided region from which the widget update data is removed.

Heretofore, the mobile device that executes an update of the display screen has been fully described. Now, a method for updating the display screen will be described in detail.

Figure 5:
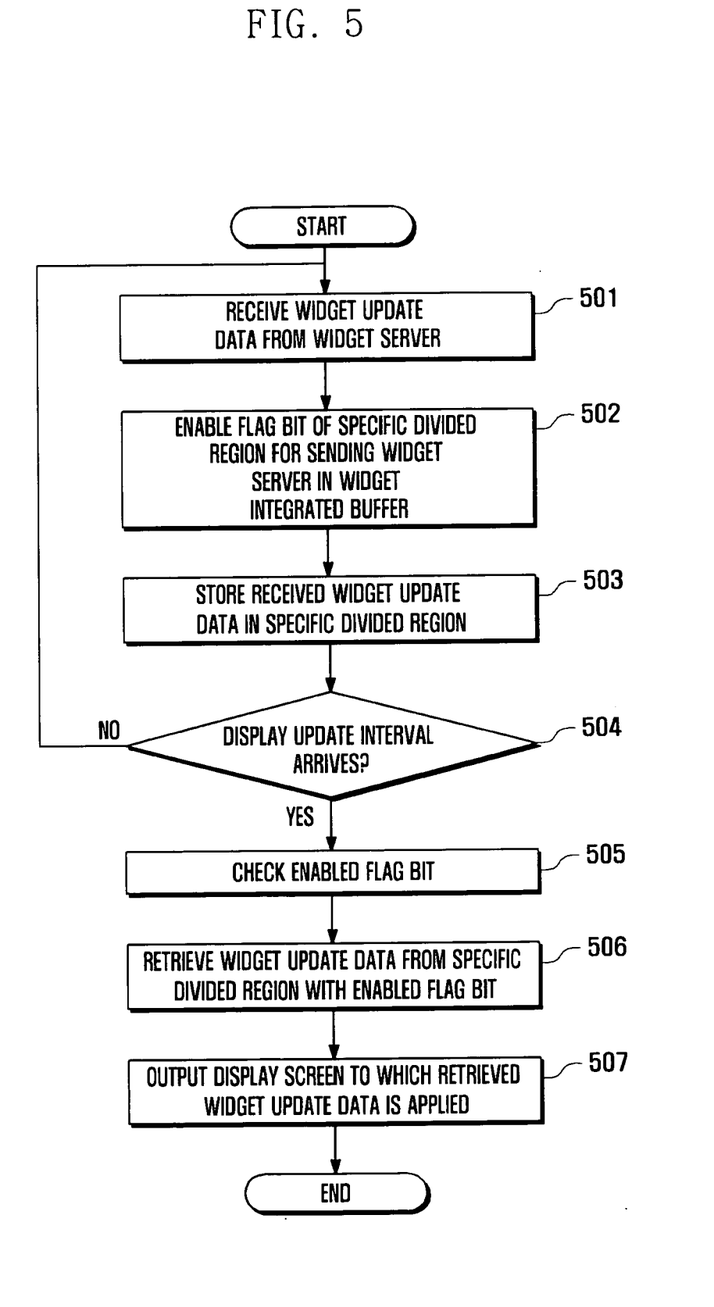
FIG. 5 illustrates a process for updating a display screen containing online widgets in accordance with an embodiment of the present invention.

FIG. 5 illustrates a process for updating a display screen containing online widgets in accordance with an embodiment of the present invention.

The following description will refer to FIG. 5 together with FIG. 2 related to the widget service system and FIG. 3 related to the mobile device 100. In addition, it is assumed that the first, second, and third widgets have already been installed in the mobile device 100 and are being executed to display their images on the display unit 150. Furthermore, it is assumed that the mobile device 100 receives the widget update data in real time from the first, second, and third widget servers 210, 220, and 230.

At the outset, the control unit 160 receives the widget update data from the first, second, and third widget servers 210, 220, and 230 by controlling the RF unit 110 (block 501). Each of the widget servers 210, 220, and 230 produces the widget update data, generates a widget update event, and sends a notification about the generation of the widget update event as well as the widget update data to the mobile device 100. For instance, if the first widget server 210 is a news widget server, this widget server produces widget update data containing news data and then sends it, together with a notification about the generation of the widget update event, to the mobile device 100. This widget update data may contain only a title and an abstract of news topics or alternatively may contain the entire news article. The respective widget servers 210, 220, and 230 may transmit the widget update data by using a data push model. Thereafter, if a user checks a certain updated widget and then desires to obtain details related to the updated widget, the mobile device 100 sends a request for data transmission to a corresponding widget server. Then the widget server may send the widget update data to the mobile device 100 by using a data pull model. In embodiments of this invention, the widget update data may contain widget ID and widget image information. The widget ID indicates identification information about the widget update data. The widget image information indicates data required for producing widget images, including a buffer size, dimensions in length and width of an image, and such.

When receiving the widget update data through the RF unit 110, the control unit 160 enables the flag bit 41 of a specific divided region, which corresponds to the widget server transmitting the widget update data, in the widget integrated buffer 131 (block 502). When receiving the widget update data, the control unit 160 ascertains which widget is related to the received widget update data and which widget server has transmitted the widget update data. The widget update data contains an identifier (e.g., widget ID) used to identify a specific widget, and through the identifier, the control unit 160 can determine which widget server has transmitted the widget update data. After ascertaining the identifier in the received widget update data, the control unit 160 selects a specific divided region corresponding to the widget server transmitting the widget update data and then enables the flag bit 41 of the selected divided region in the widget integrated buffer 131. When enabling the flag bit 41, the control unit 160 inputs a numeral '1' into the flag bit 41. Then the control unit 160 stores the received widget update data in the data bit 42 of the specific divided region that includes the enabled flag bit 41 (block 503).

In block 504, the control unit 160 determines whether the elapsed time reaches a predefined display update interval. If the elapsed time does not reach the display update interval, the control unit 160 returns to the previous block 501 and then continues to receive the widget update data from the respective widget servers 210, 220, and 230. In other words, the control unit 160 continuously receives the widget update data by controlling the RF unit 110 and then stores the received widget update data in the widget integrated buffer 131 until the display update interval arrives. In some embodiments of this invention, the control unit 160 may receive different pieces of widget update data from a single widget server or a single piece of widget update data from the respective widget servers by controlling the RF unit 110 within a single span of the display update interval.

If the elapsed time reaches the display update interval, the control unit 160 sends a display update command to the display controller 161. In block 505, display controller 161 checks the enabled flag bit 41 in the widget integrated buffer 131. Namely, the display controller 161 ascertains the flag bit 41 into which numeral '1' is inputted. Additionally, the display controller 161 retrieves the widget update data from the divided region with the enabled flag bit 41 in the widget integrated buffer 131 (block 506). In block 507, by controlling the display unit 150, the display controller 161 outputs the display screen to which the retrieved widget update data is applied. The display controller 161 in embodiments of this invention may produce an image based on the received widget update data by using an image draw routine. Here, the display controller 161 may produce images regarding the entire widget update data stored in the widget integrated buffer 131 and then display the produced images by controlling the display unit 150.

Meanwhile, the widget update data that the control unit 160 receives through the RF unit 110 may either be raw data or data encoded by the respective widget servers 210, 220, and 230. Namely, the control unit 160 may store the received widget update data in the form of raw data or encoded data in the allocated divided region of the widget integrated buffer 131. When the display update interval arrives, the control unit 160 sends a display update command to the display controller 161. Then, the display controller 161 checks the enabled flag bit 41 in the aforesaid block 505, retrieves the widget update data from the divided region with the enabled flag bit 41, decodes the retrieved widget update data in the aforesaid block 506, and then outputs the display screen depending on the decoded widget update data by controlling the display unit 150 in the aforesaid block 507. Namely, a process of deciding the widget update data is additionally inserted between the blocks 506 and 507. Here, the display controller 161 should have a suitable algorithm for decoding the encoded data. Preferably, this algorithm is the same as the algorithm used to encode raw data by the respective widget servers 210, 220, and 230.

In embodiments of this invention, after the widget update data stored in the divided region with the enabled flag bit 41 is displayed on the display unit 150 under the control of the display controller 161, the control unit 160 may remove the widget update data from the divided region and then disable the flag bit 41 of the divided region from which the widget update data is removed. When disabling the flag bit, the control unit 160 inputs numeral '0' into the flag bit. Thereafter, if new widget update data is received, the control unit 160 inputs numeral '1' into the flag bit and then stores the received widget update data. Namely, the control unit 160 repeatedly performs storing data and removing data in the widget integrated buffer 131.

A conventional mobile device produces an image of widget update data whenever receiving a notification about the generation of a widget update event. Here, the process of producing an image of widget update data is performed sequentially. Therefore, if the mobile device receives a large amount of widget update data in a short time, the amount of data processing is also increased and hence the speed of data processing becomes slower. Contrary to such conventional mobile devices, the mobile device of the present invention stores widget update data in a single integrated buffer and produces, at a scheduled time, images of stored data according to a display update interval. This may increase the speed and efficiency of data processing without causing a poor performance of the mobile device.

The above-described method for updating the display screen according to the present invention can be realized in the form of program instructions that can be executed in various computing means and be recorded in a computer-readable recording medium that may include program instructions, data files, data structures, and such. Meanwhile, the program instructions may be those specially designed and constructed for the purposes of the present invention, or they may be of the kind well-known and available to those skilled in the art of computer software arts.

A computer-readable recording medium may include any hardware devices that are specially configured to store and execute program instructions, including magnetic media such as a hard disk, a floppy disk or a magnetic tape, optical media such as a CD ROM or DVD, magneto-optical media such as a floptical disk, integrated circuit memories such as RAM, ROM or flash memory, and such. Additionally, the program instructions may include not only machine language codes made by a compiler, but also high-level language codes executable in computers through interpreters, and such. The aforesaid hardware device may be configured to operate as one or more software modules in order to perform the method of this invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to update a display screen of a mobile device, the method comprising:
   receiving widget update data from a plurality of widget servers;
   storing the received widget update data in a plurality of divided regions of a single buffer, each of the divided regions being allocated to correspond to each widget server;
   determining whether a predefined display update interval arrives; and
   displaying the widget update data stored in the divided regions after the display update interval arrives.

2. The method of claim 1, wherein storing the widget update data comprises enabling at least one flag bit of the divided regions to indicate that the widget update data in the divided regions is to be displayed.

3. The method of claim 1, wherein displaying the widget update data includes producing an image based on the widget update data using an image draw routine.

4. The method of claim 1, wherein the widget update data is widget server encoded widget update data.

5. The method of claim 4, wherein displaying the widget update data includes:
   generating decoded widget update data by decoding the encoded widget update data stored in the divided regions with at least one enabled flag bit; and
   displaying the decoded widget update data.

6. The method of claim 2, further comprising:
   disabling the at least one flag bit of the divided regions after the widget update data stored in the divided regions is displayed.

7. The method of claim 6, further comprising:
   removing the widget update data from the divided regions after the widget update data is displayed.

8. A mobile device comprising:
   a radio frequency receiver;
   a single buffer including a plurality of divided regions;
   a touch display screen; and
   a processor configured to:
      receive, via the radio frequency receiver, widget update data from the widget servers,
      control the single buffer to store the received widget data in the divided regions of the single buffer, each of the divided regions being allocated to correspond to each widget server,
      determine whether a predefined display update interval arrives, and
      control the touch screen to display the widget update data stored in the divided regions after the display update interval arrives.

9. The mobile device of claim 8, wherein the processor is further configured to:
   enable the at least one flag bit of the divided regions to indicate that the widget update data in the divided regions is to be displayed.

10. The mobile device of claim 8, wherein the widget update data comprises one of raw widget update data and encoded widget update data, wherein the encoded widget update data is encoded by the at least one widget server.

11. The mobile device of claim 10, wherein the processor is further configured to:
   generate decoded widget update data by decoding the encoded widget update data stored in the divided regions using the at least one enabled flag bit when displaying the widget update data comprising the encoded widget update data encoded by the at least one widget server; and
   control the touch display screen to display the decoded widget update data.

12. The mobile device of claim 8, wherein the processor is further configured to disable the at least one flag bit of the divided regions after the widget update data stored in the divided regions is displayed.

13. The mobile device of claim 12, wherein the processor is further configured to remove the widget update data from the divided regions after the widget update data is displayed.

14. The method of claim 1, further comprising generating the at least one divided region with the single buffer in response to installing the corresponding widget in the mobile device.

15. The method of claim 1, wherein the mobile device is configured to receive the widget update data of the corresponding widget in response to executing the corresponding widget.

16. The method of claim 1, wherein the widget update data is identified for storage in the divided regions based on the widget servers from which the widget update data is received.

17. The mobile device of claim 8, wherein the single buffer is configured to generate the divided regions in response to installing the corresponding widget in the mobile device.

18. The mobile device of claim 8, wherein the radio frequency receiver is configured to receive the widget update data of the corresponding widget in response to executing the corresponding widget on the mobile device.

19. The mobile device of claim 8, wherein the single buffer is configured to identify the widget update data for storage in the divided regions based on a widget server from which the widget update data is received.

20. The mobile device of claim 8, wherein the mobile device includes at least one of a mobile communication terminal, a digital broadcasting receiver, a personal digital assistant (PDA), and a smart phone.

* * * * *